(12) United States Patent
Dwivedi

(10) Patent No.: US 11,851,288 B2
(45) Date of Patent: Dec. 26, 2023

(54) SYSTEM AND METHOD FOR UNIFORM DISTRIBUTION OF ARTICLES

(71) Applicant: Körbor Supply Chain LLC, DFW Airport, TX (US)

(72) Inventor: Rajeev Dwivedi, Plano, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 91 days.

(21) Appl. No.: 17/266,329

(22) PCT Filed: Aug. 29, 2019

(86) PCT No.: PCT/US2019/048716
§ 371 (c)(1),
(2) Date: Feb. 5, 2021

(87) PCT Pub. No.: WO2020/060739
PCT Pub. Date: Mar. 26, 2020

(65) Prior Publication Data
US 2021/0309464 A1    Oct. 7, 2021

Related U.S. Application Data

(60) Provisional application No. 62/733,938, filed on Sep. 20, 2018.

(51) Int. Cl.
*B65G 47/31* (2006.01)
*B07C 1/04* (2006.01)
(Continued)

(52) U.S. Cl.
CPC ............... *B65G 47/31* (2013.01); *B07C 1/04* (2013.01); *B65G 37/005* (2013.01); *B65G 43/08* (2013.01);
(Continued)

(58) Field of Classification Search
CPC ...... B65G 47/31; B65G 37/005; B65G 43/08; B65G 2203/0233; B65G 2203/041; B65G 2811/095; B07C 1/04
See application file for complete search history.

(56) References Cited

U.S. PATENT DOCUMENTS 5,267,638 A * 12/1993 Doane .................... B65G 47/70
198/444
6,471,044 B1 * 10/2002 Isaacs .................. B65G 47/682
198/460.1
(Continued)

FOREIGN PATENT DOCUMENTS

EP    1280720 A1    2/2003
EP    1556297 A1    7/2005
(Continued)

OTHER PUBLICATIONS

Westermeier et al, Device And Method For Handling Piece Goods Moved In At Least Two Parallel Rows, Apr. 11, 2019, Germany, DE 102017123558 A1 (Year: 2019).*
(Continued)

*Primary Examiner* — Gene O Crawford
*Assistant Examiner* — Lester Rushin, III
(74) *Attorney, Agent, or Firm* — Price Heneveld LLP

(57) ABSTRACT

A system for distributing a stream of articles includes a belt assembly (210) with a plurality of belt segments (212) carrying a stream of articles (150), a sensor assembly (220) with a plurality of sensors (222), a control system (240) interfacing with the belt assembly (210) and the sensor assembly (220), wherein the sensor assembly (220) determines spacing (230) in the stream of articles (150), and wherein the control system (240) controls a speed of the plurality of belt segments (212) to minimize the spacing
(Continued)

(230) in the stream of articles (150) when the spacing (230) is greater than a predefined threshold.

10 Claims, 3 Drawing Sheets

(51) Int. Cl.
    *B65G 37/00*     (2006.01)
    *B65G 43/08*     (2006.01)

(52) U.S. Cl.
    CPC ............... *B65G 2203/0233* (2013.01); *B65G 2203/041* (2013.01); *B65G 2811/095* (2013.01)

(56) References Cited

U.S. PATENT DOCUMENTS

| | | | |
|---|---|---|---|
| 6,629,593 B2 * | 10/2003 | Zeitler | B65G 43/08 198/460.3 |
| 7,556,144 B2 * | 7/2009 | Cotter | B65G 47/53 198/810.01 |
| 9,731,856 B1 * | 8/2017 | Houlihan | B65C 9/46 |
| 10,183,810 B2 * | 1/2019 | Kaltenhäuser | B65G 21/20 |

FOREIGN PATENT DOCUMENTS

| | | | | |
|---|---|---|---|---|
| WO | WO-2004039706 A1 * | 5/2004 | | B65G 15/22 |
| WO | 2006002156 A1 | 1/2006 | | |

OTHER PUBLICATIONS

PCT International Search Report and Written Opinion of International Searching Authority dated Nov. 29, 2019 corresponding to PCT International Application No. PCT/US2019/048716 filed Aug. 29, 2019.

* cited by examiner

SYSTEM AND METHOD FOR UNIFORM DISTRIBUTION OF ARTICLES

BACKGROUND

1. Field

Aspects of the present disclosure generally relate to the technical field of mail and parcel processing techniques.

2. Description of the Related Art

An automatic parcel singulation system, herein also referred to as singulator, transforms a bulk flow of articles, such as for example mail items including parcels or packages, into an aligned flow. "Singulation" refers to the re-arrangement of a disordered flow or stream of articles into one or more single-file output streams. A distinguishing feature of a singulated stream is the absence of side-by-side articles. Further, consecutive articles are separated by a gap. Singulation is called for in applications where articles, e.g. parcels, originating from a bulk process need to undergo serial processing steps. Bulk processes include unloading, dumping, depalletizing, etc. Serial processing steps include bar code scanning, metering, weighing, labelling, diverting, etc.

Existing singulation systems can singulate and redistribute mail items to meet a certain throughput and according to a specific pitch and/or gap requirement. In an example, a conveyer, e.g., conveyer belt, also referred to as provision belt, feeds the singulation system, and a distribution of mail items, such as parcels, may only be controlled based on a one-dimensional (1-D) observation which may lead to non-uniform parcel delivery. A possible solution is to increase an upstream speed of the provision belt, but such a speed increase has very limited or no impact, especially with respect to gaps and gap closures between parcels.

SUMMARY

A first aspect of the present disclosure provides a system for distributing a stream of articles comprising a belt assembly comprising a plurality of belt segments carrying a stream of articles, a sensor assembly comprising a plurality of sensors, a control system interfacing with the belt assembly and the sensor assembly, wherein the sensor assembly determines spacing in the stream of articles, and wherein the control system controls a speed of the plurality of belt segments to minimize the spacing in the stream of articles when the spacing is greater than a predefined threshold.

A second aspect of the present disclosure provides a method for distributing a stream of articles comprising, through operation of at least one processor in a control system configured via executable instructions included in at least one memory, receiving sensor data of a stream of articles travelling on an infeed conveyor belt, determining spacing within the stream of articles on the infeed conveyor belt based on the sensor data, and controlling belt segments in order to minimize the spacing when the spacing is greater than a predefined threshold.

A third aspect of the present disclosure provides a non-transitory computer readable medium comprising instructions that when executed by at least one processor perform a method for distributing a stream of articles as described herein.

DETAILED DESCRIPTION

To facilitate an understanding of embodiments, principles, and features of the present disclosure, they are explained hereinafter with reference to implementation in illustrative embodiments. In particular, they are described in the context of being a system and a method for uniform distribution of articles, such as for example parcels, packages or other mail items, in an automated processing stream. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
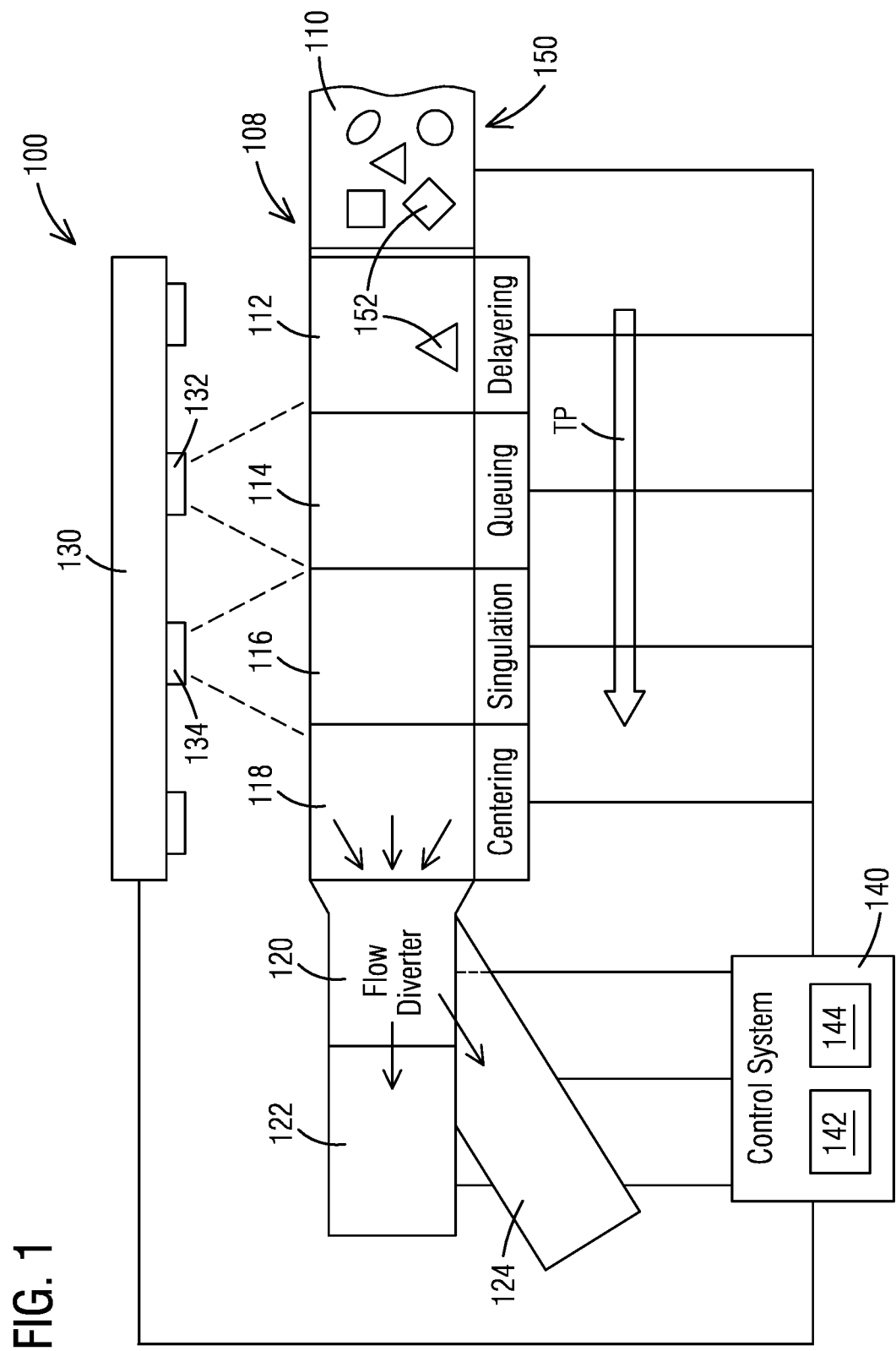
FIG. 1 depicts a schematic view of a singulation system in accordance with an exemplary embodiment of the present disclosure.

FIG. 1 depicts a schematic view of a singulation system in accordance with an exemplary embodiment of the present disclosure.

In an exemplary embodiment of the present disclosure, the system 100 includes an automated processing stream 108 comprising a plurality of processing units and configured to carry a stream of articles 150. Typically, the stream of articles 150 comprises parcels or other mail items, such as parcels 152, as an incoming stream for the system 100. In operation of the system 100, bulk stacks of parcels or other mail items are loaded, either by human operators or automated by machines, onto an infeed conveyor belt 110, also referred to provision belt. The automated processing stream 108 defines a transport path illustrated by arrow TP. The stream of articles 150 travels along the transport path TP. The stream of articles 150 typically comprises parcels or other mail items in various shapes and sizes, including for example boxes, polybags, large envelopes, paper bags, and padded envelopes etc.

The automated processing stream 108 comprises for example a subsequent sequence of operations including, but not limited to, delayering, singulating, aligning, gapping, scanning, weighing, and distributing to one or more inductions on an automatic sorting machine. As FIG. 1 illustrates, the exemplary processing stream 108 includes a delayering unit 112, a queuing unit 114, a singulation unit 116, a centering merge 118 and a flow diverter 120.

The delayering unit 112 includes process step 'delayering' which may also be known as 'delaminating' and refers to (re-)arrangement of a disordered stream of articles with respect to a three-dimensional space. After delayering or delamination, the articles are not stacked one on top of the other, but may still be arranged in a two-dimensional space, for example side by side. The articles are queued, e.g. lined up, utilizing the queuing unit 114, before the articles are singulated via the singulation unit 116. The process step 'singulation' refers to the (re-)arrangement of a disordered flow or stream of articles with respect to a two-dimensional space into one or more single-file output streams (absence of side-by-side parcels). The centering merge 118 comprises process step centering and merging of the singulated articles within the processing stream 108. It should be noted that the processing stream 108 may comprise more or less than the described operations/units. For example, processing stream 108 may not comprise a queuing unit 114, or processing stream 108 may instead or additionally comprise process step 'gapping'.

The automated processing stream 108 can further comprise a flow diverter 120 for diverting the processing stream 108 into first sub-stream 122 and second sub-stream 124. The flow diverter 120 is arranged after the singulation unit 116 with respect to the transport path TP of the automated processing stream 108.

In an example, the singulation unit 116 comprises multiple variable-speed belt actuators, each controlled by a servomotor. The actuators move independently, and each article (parcel) may be manipulated to optimize speed and orientation for singulation. The servomotors accelerate and decelerate each belt to pull parcels away from the incoming flow in a sequence determined by a control algorithm stored in control system 140 and monitored by a vision system 130. Moving parts of machines in a controlled manner, such as the servomotors accelerating and decelerating the belt actuators, may also be referred to as motion control which is handled/performed by the control system 140. The articles (parcels) may be aligned lengthwise or crosswise in order to optimize gaps and to move through the downstream system more smoothly. The delayering unit 112 and queuing unit 114 may also comprise belt actuators for processing of the stream of articles 150. In another example, the delayering unit 112 may comprise multiple individually and selectively controlled rollers, controlled by control system 140.

The system 100 further comprises vision system 130 comprising at least one sensor 130, and the control system 140 comprising at least one processor 142 and interfacing with the automated processing stream 108 and the vision system 130. In an exemplary embodiment, the vision system 130 comprises at least one image sensor. In our example, the vision system comprises at least two image sensors 132, 134, wherein each sensor 132, 134 is for example a digital camera, for example down-looking cameras. The sensors 132, 134, e.g., digital cameras, are arranged so that they cover essentially a whole surface, i.e. length and width, of the processing stream 108, specifically processing units 110, 112, 114, 116, 118, to detect locations/positions of articles of the stream of articles 150 travelling in the processing stream 108. In an example, the image sensors 132, 134 are arranged and configured to detect a position and/or size and/or orientation of each of the articles and to transmit corresponding data, e.g. position data and/or size data and/or orientation data to the control system 140. It should be noted that the vision system 130 may comprise more or less than two image sensors, and that instead of digital cameras, other devices capable of providing position, size and/or orientation data may be utilized.

The control system 140 interfaces with the processing stream 108, specifically controls the processing units 110, 112, 114, 116, 118, 120. The control system 140 is configured to receive data and information from the vision system 130 and to control the processing stream 108, for example delayering unit 112, queuing unit 114 and singulation unit 116, based on data and information provided by the vision system 130. Data transmission between the vision system 130, the control system 140 and the processing units 110, 112, 114, 116, 118 and 120 may be wired, for example via Ethernet cable, or may be wireless, for example via Internet (Wi-Fi).

Existing systems, such as system 100 of FIG. 1, singulate and redistribute mail items to meet a certain throughput and according to a specific pitch and/or gap requirement. The infeed conveyer belt 110 feeds the system 100, wherein a distribution of articles 152 of the stream of articles 150 may only be controlled based on a one-dimensional (1-D) observation which may lead to non-uniform package delivery. For example, gaps may exist between articles 152 and it may be desirable to close gaps between articles 152 in order to increase throughput of articles.

Figure 2:
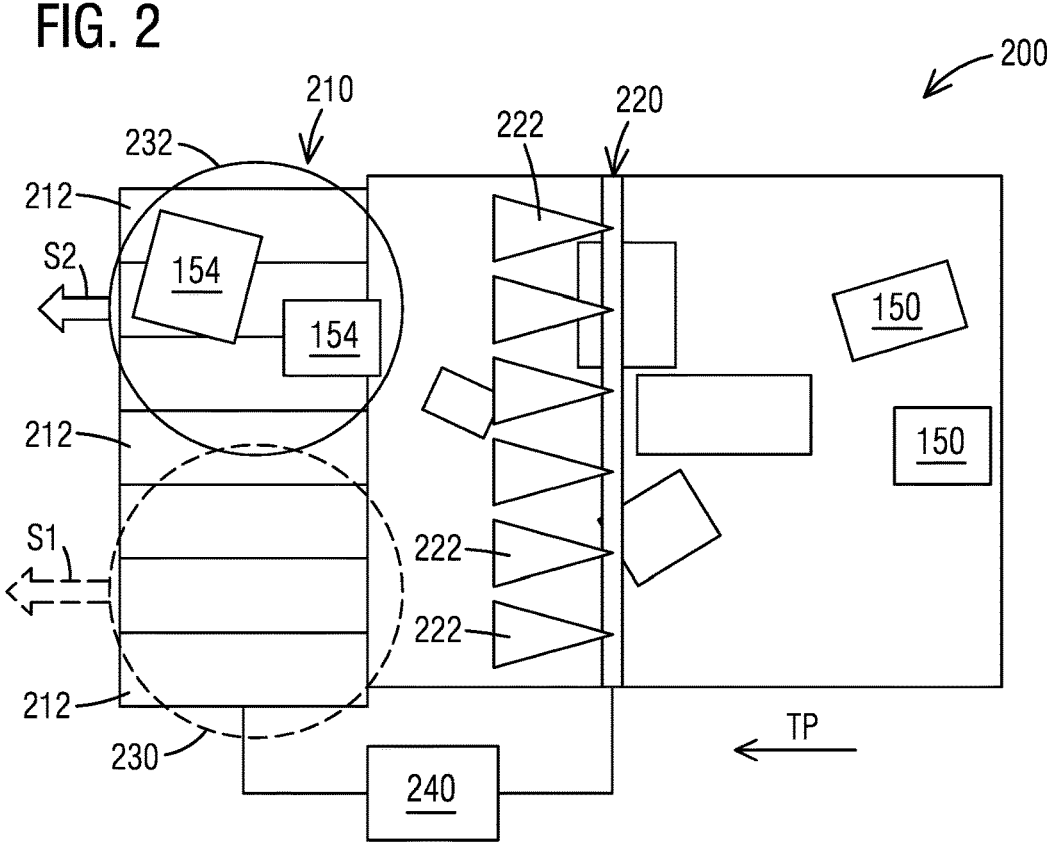
FIG. 2 depicts a schematic view of an infeed conveyor belt in accordance with an exemplary embodiment of the present disclosure.

FIG. 2 illustrates an infeed conveyor belt 200 in accordance with an exemplary embodiment of the present disclosure. The infeed conveyor belt 200 can be a component of the mail processing system 100 and can be configured for example as the infeed conveyer belt 110 of FIG. 1. The direction of a transport path is indicated by arrow TP.

The infeed conveyor belt 200 comprises a belt assembly 210 comprising a plurality of belt segments 212 and a sensor assembly 220 comprising a plurality of sensors 222. The belt assembly 210 may also be referred to as multi-segment belt and the sensor assembly as multi-segment sensor. In our example, the belt assembly 210 comprises multiple belt segments 212 and the sensor assembly comprises multiple sensors 222.

The plurality of belt segments 212 is arranged in a lateral direction. In an example, the belt segments 212 comprise multiple variable-speed belt actuators, each controlled by a servomotor. The actuators move independently, and each article 154 may be manipulated to optimize speed and/or orientation. The servomotors accelerate and/or decelerate each belt to accelerate or decelerate parcels 154 determined by a control algorithm stored in control system 240 and monitored by sensor assembly 220. Moving parts of machines in a controlled manner, such as the servomotors accelerating and decelerating the belt actuators, may also be referred to as motion control which is handled/performed by the control system 240. The articles 154 may be aligned lengthwise or crosswise in order to optimize gaps and to move through the downstream system more smoothly.

The sensor assembly 220 comprises a plurality of sensors 222, at least two image sensors 222, wherein each sensor 222 is for example a digital camera. The sensors 222, e.g., digital cameras, are arranged so that they cover essentially a whole surface, i.e. length and width, of the conveyor belt 200, to detect locations/positions of spacing or gaps 230 of the stream of articles. In an example, the image sensors 222 are arranged and configured to detect spacing 230, for example by detect position and/or size and/or orientation of each article 154 and to transmit corresponding data, e.g. position data and/or size data and/or orientation data to the control system 240. It should be noted that the sensor assembly 220 may comprise more or less than two image sensors 222, and that instead of digital cameras, other devices capable of providing position, size and/or orientation data may be utilized.

Control system 240 interfaces with the conveyor belt 200, specifically belt assembly 210 and sensor assembly 220. The infeed conveyor belt 200 with multi-segment belt 210 and multi-segment sensor 220 can be configured as stand-alone application or equipment, arranged or positioned at a beginning of a processing stream, such as processing stream 108 of FIG. 1. For example, the infeed conveyor belt 110 of FIG. 1 can be configured as conveyor belt 200, as described with respect to FIG. 2. In another embodiment, the infeed conveyor belt 200, for example the function(s) of belt 200, can be integrated into an existing processing stream, such as processing stream 108 of FIG. 1, wherein existing components or equipment, for example the singulation unit 116, perform and provide the function and method of the infeed conveyor belt 200. In this case, the control system 240 may be integrated or incorporated into existing control system 140.

The sensor assembly 200 determines or identifies spacing or gaps 230 within the stream of articles 150, for example between articles, and provides measurements relating to the spacing 230 to the control system 240. FIG. 2 further illustrates that areas of high density of articles, such as area 232, can be detected by the sensor assembly 220. In our example, parcels 154 are in high density area 232.

The control system 240 calculates and controls a speed S1, S2 of the plurality of belt segments 212 to minimize the spacing 230, e.g., to close gaps, between the articles, for example when the spacing 230 is greater than predefined threshold(s). Belt segments 212 are decelerated in areas 232 of high article density, indicated by speed S2, whereas belt segments 212 in low article density areas, e.g. spacing 230, are accelerated to pull more parcels, indicated by speed S1. In our example, speed S1 of the belt segments 212 in spacing 230 is greater than speed S2 of the belt segments 212 in high density area 232.

Specifically, sensor assembly 220 detects positions of parcels and corresponding position data are being transmitted to the control system 240. In order to close gap or spacing 230, belt segments 212 of this low density area are accelerated to pull parcels from stream of articles 150. Further, belt segments 212 carrying parcels 154 in high density area 232 are decelerated or sustain lower speeds S2.

The sensor assembly 220 is configured to continuously detect the (actual) positions of articles, and to transmit position data to the control system 240. The control system 240 is configured, through operation of the at least one processor, to decelerate or accelerate belt segments 212 in order to close spacing or gaps 230. In other words, the multiple belt segments 212 synchronize with one or more sensors 222 of the sensor assembly 220 that can identify voids or gaps in the stream of articles 150.

Figure 3:
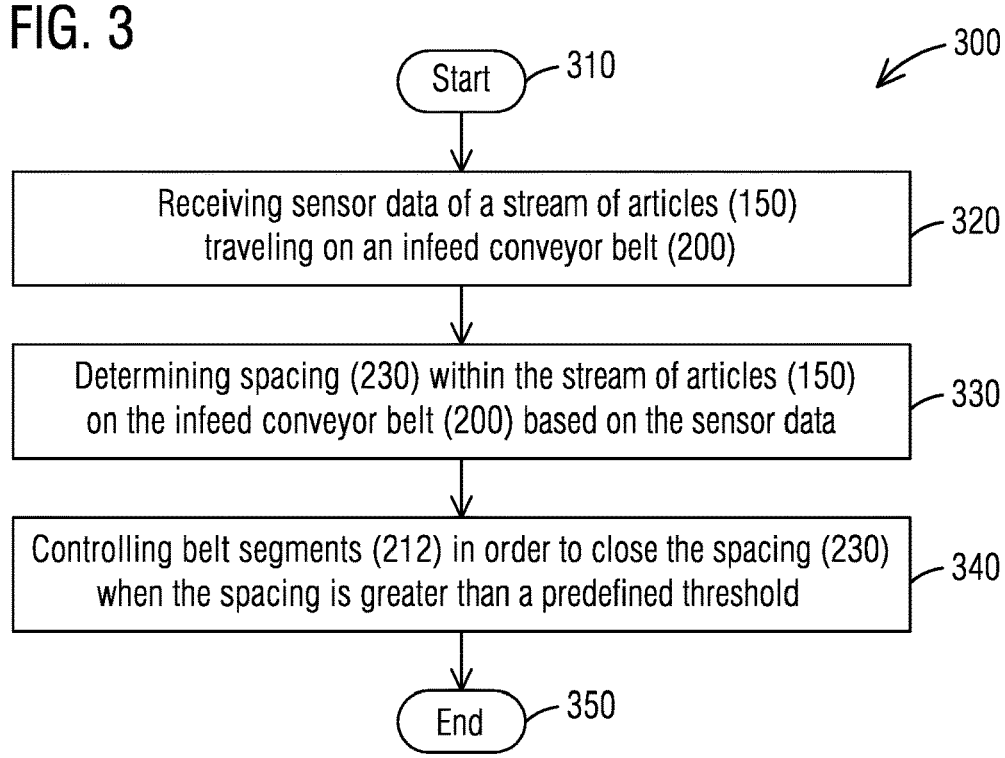
FIG. 3 depicts a flow chart of a method for distributing a stream of articles in accordance with an exemplary embodiment of the present disclosure.

FIG. 3 depicts a flow chart of a method 300 for distributing a stream of articles 150 in accordance with an exemplary embodiment of the present disclosure. While the method 300 is described as a series of acts that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 300 may start at 310 and may include an act 320 of receiving sensor data of a stream of articles 150 travelling on an infeed conveyor belt 200. The method 300 may also include an act 330 of determining spacing 230 within the stream of articles 150 on the infeed conveyor belt 200 based on the sensor data. Further, the method 300 may include an act 340 of controlling belt segments 212 in order to close the spacing 230 when the spacing is greater than a predefined threshold. At 350, the method 300 may end. It should be appreciated that this described method 300 may include additional acts and/or alternative acts corresponding to the features described with respect to the system 100 and control systems 140, 240 (see FIG. 1 and FIG. 2).

In an embodiment, sensor assembly 220 measures a length and/or width of the spacing 230 and transmits the length of the spacing 230 to the control system 140, 240. The control system 140, 240 calculates and controls speed of the belt segments 212 in order to minimize the spacing 230 between articles of the stream of articles 150, for example when the length of the spacing 230 is greater than a predefined length threshold. In another embodiment, sensor assembly 220 provides position data of articles to the control system 240 and the control system 240 calculates the spacing 230, such as length and/or width, within the stream of articles 150.

It should be appreciated that acts associated with the above-described methodologies, features, and functions (other than any described manual acts) may be carried out by one or more data processing systems, such as for example control system 140 or 240 via operation of at least one processor. As used herein, a processor corresponds to any electronic device that is configured via hardware circuits, software, and/or firmware to process data. For example, processors described herein may correspond to one or more (or a combination) of a microprocessor, central processing unit (CPU) or any other integrated circuit (IC) or other type of circuit that is capable of processing data in a data processing system. As discussed previously, the processor that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

Figure 4:
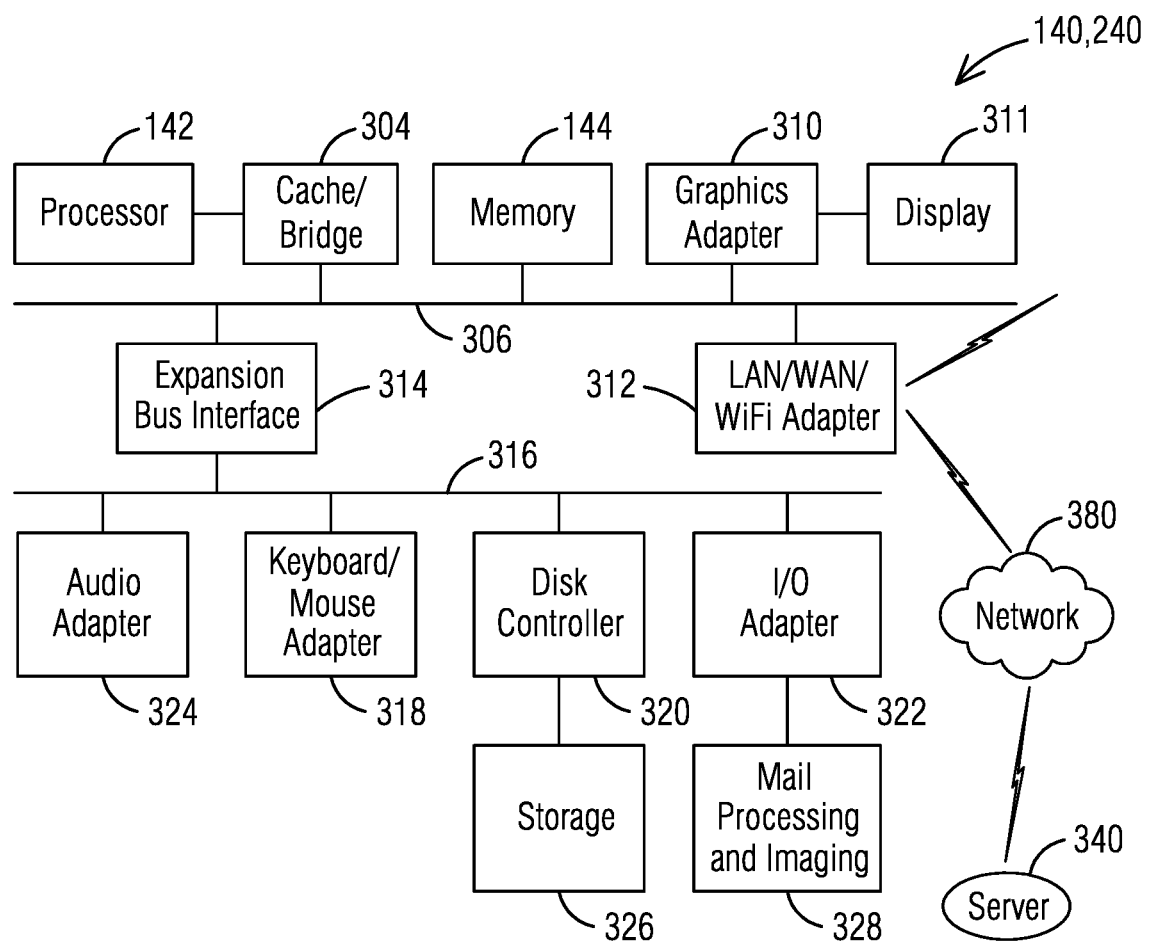
FIG. 4 depicts a block diagram of a control system of a system for distributing a stream of articles in accordance with an exemplary embodiment of the present disclosure.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions)

contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++ or any other form of code that can be programmed/configured to cause at least one processor to carry out the acts and features described herein. Still further, results of the described/claimed processes or functions may be stored in a computer-readable medium, displayed on a display device, and/or the like FIG. 4 depicts a block diagram of a control system, herein also referred as a data processing system, in which an embodiment can be implemented, for example as a control system 140 (see FIG. 1) or control system 240 (see FIG. 2) for uniform distribution of articles in an automated processing stream as described before and can be configured to perform processes as described herein.

In an exemplary embodiment, the control system 140 or 240 includes processor 142 connected to a level two cache/bridge 304, which is connected in turn to a local system bus 306. Local system bus 306 may be, for example, a peripheral component interconnect (PCI) architecture bus. Also connected to local system bus 306 in the depicted example are a main memory 144 and a graphics adapter 310. The graphics adapter 310 may be connected to display 311.

Other peripherals, such as local area network (LAN)/wide area network (WAN)/Wireless (e.g., Wi-Fi) adapter 312, may also be connected to local system bus 306. Expansion bus interface 314 connects local system bus 306 to input/output (I/O) bus 316. I/O bus 316 is connected to keyboard/mouse adapter 313, disk controller 320, and I/O adapter 322. Disk controller 320 can be connected to a storage 326, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 322 can be connected to mail processing and imaging devices 323, for example to image, scan, transport, label, address-process, sort, and otherwise processes the articles, such as the stream of articles 150, in accordance with the various embodiments described herein. Also connected to I/O bus 316 in the example shown is audio adapter 324, to which speakers (not shown) may be connected for playing sounds. Keyboard/mouse adapter 313 provides a connection for a pointing device (not shown), such as a mouse, trackball, track-pointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

LAN/WAN/Wireless adapter 312 can be connected to a network 330 (not a part of data processing system 140), which can be any public or private data processing system network or combination of networks, as known to those of skill in the art, including the Internet. LAN/WAN/Wireless adapter 312 can also communicate with parcels A, B, C, D, E as described herein and perform other data processing system or server processes described herein. Data processing system 140 can communicate over network 330 with one or more server systems 340, which are also not part of data processing system 140, but can be implemented, for example, as separate data processing systems. A server system 340 can be, for example, a central server system at a central mail processing facility.

The invention claimed is:

1. A system for distributing a stream of articles, comprising:
a belt assembly comprising a plurality of belt segments carrying a stream of articles;
a sensor assembly comprising a plurality of sensors;
a control system interfacing with the belt assembly and the sensor assembly;
wherein the sensor assembly determines spacing in the stream of articles;
wherein the sensor assembly measures a length and/or width of the spacing and transmits the length and/or width of the spacing to the control system;
wherein the control system controls a speed of the plurality of belt segments to minimize the spacing in the stream of articles when the spacing is greater than a predefined threshold;
wherein the belt segments are arranged in a lateral direction; and
wherein the belt segments include multiple speed belt actuators each controlled by a servo motor, wherein the actuators move independently from one another such that each article may be manipulated to be aligned lengthwise or crosswise to minimize spacing between the articles and to optimize an orientation of each article for singulation.

2. The system of claim 1, wherein the control system calculates and controls speed of the belt segments in order to minimize the spacing between articles of the stream of articles when the length and/or width of the spacing is greater than a predefined length/width threshold.

3. The system of claim 1, wherein the belt segments are accelerated to minimize the spacing and to pull more articles of the stream of articles.

4. The system of claim 1, wherein the plurality of sensors comprises image sensors.

5. The system of claim 4, wherein the image sensors comprise digital cameras.

6. The system of claim 1, configured as an infeed conveyor belt of a mail and parcel processing system.

7. A method for distributing a stream of articles, comprising:
through operation of belt segments, a sensor assembly and at least one processor in a control system configured via executable instructions included in at least one memory;
receiving sensor data of a stream of articles travelling on an infeed conveyor belt;
determining, by the sensor assembly, spacing within the stream of articles on the infeed conveyor belt based on the sensor data;
measuring, by the sensor assembly, length and/or width of the spacing and transmitting the length and/or width of the spacing to the control system;
controlling belt segments in order to minimize the spacing when the spacing is greater than a predefined threshold;

wherein the belt segments are arranged in a lateral direction; and wherein the belt segments include multiple speed belt actuators each controlled by a servo motor, wherein the actuators move independently from one another such that each article may be manipulated to be aligned lengthwise or crosswise to minimize spacing between the articles and to optimize an orientation for each article for singulation.

8. The method of claim 7, wherein the control system calculates and controls speed of the belt segments in order to minimize the spacing between articles of the stream of articles when the length and/or width of the spacing is greater than a predefined length/width threshold.

9. The method of claim 7, wherein the sensor assembly provides position data of articles to the control system and the control system calculates the spacing within the stream of articles.

10. The method of claim 7, wherein the belt segments are accelerated to minimize the spacing and to pull more articles of the stream of articles.

\* \* \* \* \*

UNITED STATES PATENT AND TRADEMARK OFFICE
CERTIFICATE OF CORRECTION

PATENT NO. : 11,851,288 B2
APPLICATION NO. : 17/266329
DATED : December 26, 2023
INVENTOR(S) : Rajeev Dwivedi It is certified that error appears in the above-identified patent and that said Letters Patent is hereby corrected as shown below:

In the Specification

Column 1, Line 14:
After "as" insert -- a --

Column 1, Line 31:
After "as" insert -- a --

Column 2, Line 46:
After "to" insert -- as a --

Column 3, Line 40:
"130" should be — 132, 134 —

Column 4, Lines 26, 27:
After "as" insert -- a --

Column 4, Line 54:
"detect" should be — detecting —

Column 5, Line 31:
"are" should be — is —

Column 6, Line 31:
After "in" (2nd occurrence) insert -- the --

Column 6, Line 50:
"setup" should be — set up —

Signed and Sealed this
Fifth Day of November, 2024

Katherine Kelly Vidal
*Director of the United States Patent and Trademark Office*

CERTIFICATE OF CORRECTION (continued)
U.S. Pat. No. 11,851,288 B2

Column 6, Line 57:
"configures" should be — configured —

Column 7, Line 15:
After "like" insert -- . --

Column 7, Line 17:
After "referred" insert -- to --

In the Claims

Column 9, Claim 7, Line 8:
"for" should be — of —